June 19, 1962    J. W. HARRISON ETAL    3,039,664
FILM DISPENSERS

Filed Aug. 4, 1959    2 Sheets-Sheet 1

INVENTORS
JOHN W. HARRISON
THOMAS E. FORD
ROBERT L. DRYFUS
MILTON A. HOWE, JR.

BY
ATTORNEYS

June 19, 1962  J. W. HARRISON ETAL  3,039,664
FILM DISPENSERS

Filed Aug. 4, 1959  2 Sheets-Sheet 2

INVENTORS
JOHN W. HARRISON
THOMAS E. FORD
ROBERT L. DRYFUS
MILTON A. HOWE, JR.

BY *Cushman Darby Cushman*

ATTORNEYS

United States Patent Office 3,039,664
Patented June 19, 1962

3,039,664
FILM DISPENSERS
John W. Harrison, Winchester, Thomas E. Ford and Robert L. Dreyfus, Arlington, and Milton A. Howe, Jr., Bedford, Mass., assignors to W. R. Grace & Co., Cambridge, Mass., a corporation of Connecticut
Filed Aug. 4, 1959, Ser. No. 831,519
8 Claims. (Cl. 225—18)

The present invention relates to a film cutter and more particularly to a new and improved method and machine for cutting a roll of highly oriented film into sheets suitable for package wrapping.

An important object consists in providing a cutter for severing material into predetermined length having a substantially V-shaped blade provided at its vertex with means for weakening the material, such as a sheet of film or the like, so that as the material is brought into contact with the blade, it will be evenly cut into sheets of the desired length.

Another object is to provide a film cutter or sheeter provided with V-shaped cutting edges, having a pointed member such as a needle or the like positioned below the film so as to pierce the same as it is brought downward over the blade and in such a manner that the edges of the blade will be everywhere approximately equally distant in a vertical direction from the parting line of the film, in order to obtain a straight tear as the film is severed into sheets.

A further object consists in substituting for the needle in the center of a V-shaped sheeter or blade, a small hot member in the form of an electric wire so as to initiate a tear in the center of the sheet. The wire is bent or shaped to have a transverse elongated body or intermediate portion in the form of a loop, the ends of which extend beyond a recess or slot at the vertex of a V-shaped blade so as to insure the smooth and uniform cutting of the film or sheet material during the operation of the machine. It will be seen that, as the film is brought over the heated wire, the film melts at this point and, as the film is moved into engagement with the tear propagating edges of the blade along the transverse parting line of the film, the latter will be severed into a sheet of predetermined length. This operation requires less force than initially penetrating the film centrally with a needle, due to the fact that, after the softening point is reached, the tensile strength is very low and it is easier to make a tear. Moreover, the fingers of the operator may be moved over the hot member without danger of burning the same.

Another object is to provide an improved method for cutting oriented plastic film and the like into sheets of predetermined lengths.

Other objects and advantages of the invention will become apparent from the following description when taken in conjunction with the accompanying claims and drawings.

Referring to the drawing.

Figure 2:
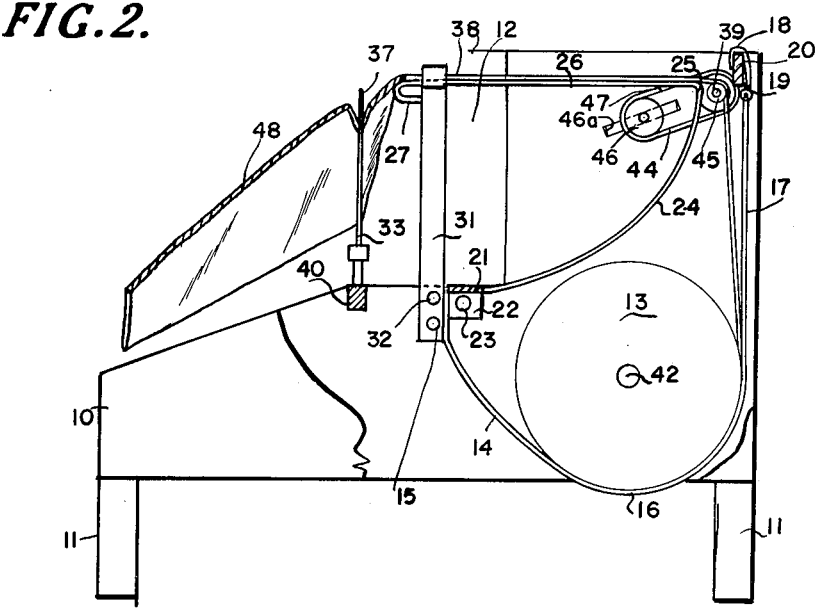
FIGURE 2 is a side view of FIGURE 1 with parts in section for clearness of illustration.
Figure 1:
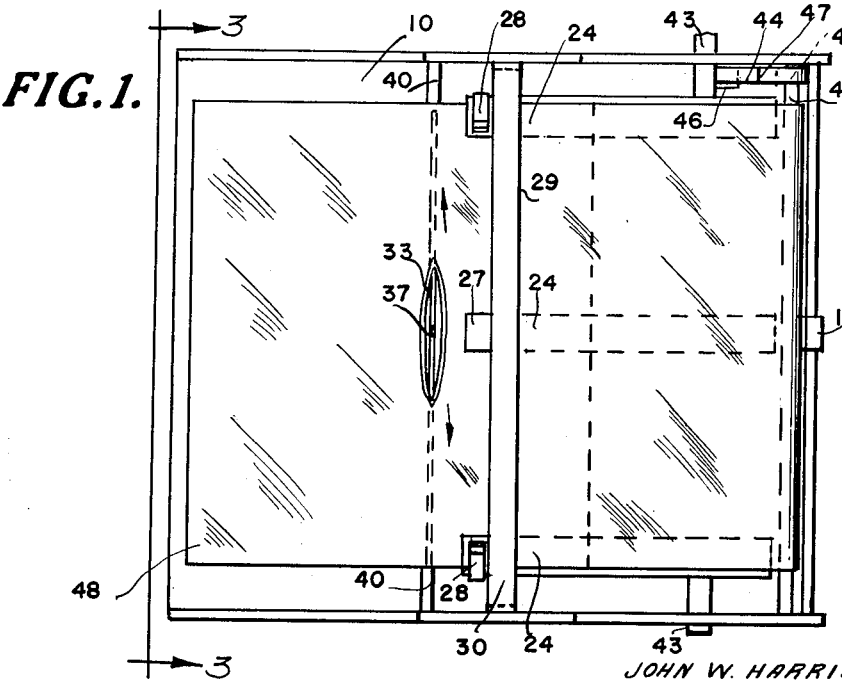
FIGURE 1 is a plan view of a cutter machine constructed in accordance with the present invention.

Referring to the drawing, 10 indicates a casing having supporting legs 11 and provided with an open top 12. Rotatably mounted within the casing is a roll of film 13 or other sheet material, which may be in the form of highly oriented film to be cut into sheets suitable for package wrapping and the like. In order to cut the film into the desired shape and size at a minimum expenditure of time, effort and cost, the roll of film 13 mounted in the casing may be peripherally engaged by an elastic member, such as a rubber strap 14, connected at its inner end as at 15 to the casing and having an intermediate portion, which passes over and engages centrally with the outer surface of the roll of film as at 16. After passing the roll of film, the strap 14 extends upwardly as at 17 and may be connected to a hook 18 as at 19, so as to be detachably connected to a transverse bar 20 of the casing (FIG. 2). The purpose of the strap is to act as a brake.

Extending transversely within the frame is a flat bar 21 having depending ends 22 secured to the sides of the casing in any suitable manner as at 23. Extending outwardly and laterally from one side of the bar 21 are spaced yieldable curved arms 24 (FIG. 2), each of which adjacent the top of the casing is bent as at 25 to form a yieldable horizontal portion 26 that extends outwardly and away from the roll of film 13 and may have an inwardly bent end portion 27. As shown, three of the arms 24 are provided but this number may be varied, and the end arms may each be formed with an upwardly and laterally disposed guide finger 28 for engaging the marginal side of the film or sheet material, so as to guide the same as it issues from the roll 13.

Figure 3:
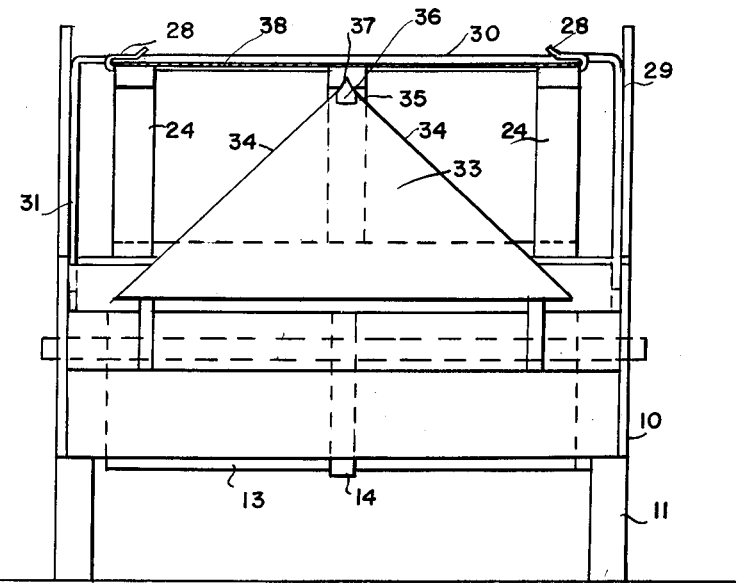
FIGURE 3 is an end view taken substantially along the line 3—3 of FIGURE 2.

A substantially U-shaped member or strap 29 has a transverse horizontal portion 30 extending over and above the arms 24 so as to be spaced therefrom. The depending sides 31 of the U-shaped member 29 are secured at their lower ends to the adjacent sides of the casing by any suitable means as at 32 (FIG. 2). Extending upwardly from the casing and in front of the U-shaped member 29 is a thin V-shaped blade 33 or sheeter having inclined cutting edges 34, the apex of which may be provided with a slot 35 (FIG. 3) for receiving the lower end or butt 36 of a needle or pointed member 37 positioned below and centrally of the free end portion 38 of the film as the latter issues from the roll 13 and passes upwardly over a guide roll 39 and then outwardly over the yieldable horizontal arms 26 and beneath the guide fingers 28. As the end portion 38 is manually pulled a predetermined distance beyond the needle 37, the film is moved downwardly by the hands of the operator, so as to cause the needle to pierce the film. It will be seen that, as the film is moved downwardly over the blade 33, the edges of the blade will be substantially equally distant in a vertical direction from the parting line of the film caused by the needle 37, so as to insure a straight tear. The blade may be of triangular shape and its lower end or base may be connected to spaced transverse members or bars 40 carried by the casing in any suitable manner, so as to insure maintaining the blade and needle firmly in a fixed operative position. The elastic band or strap 14 provides tension means for the roll of film 13 and may readily be detachably connected to the casing. A shaft 42 extends transversely through the roll of film 13 and has its end portion 43 projecting through aligned openings so as to extend beyond the sides of the casing and provide a trunnion support for the film.

An endless belt 44 winds around space pulleys 45 and 46 and is provided with a tape marker 47, so as to provide means for determining the length of the end portion 48 of the film to be severed by the needle and its associated blade. The pulley 45 may be connected to a transverse shaft 49 carried by the casing.

Endless belt 44 may be fabricated from elastic material so that the loop length may be varied as desired in order to determine different lengths of sheets for wrapping different sizes of products.

The axis of pulley 46 is movable in slot 46a to vary the distance between the axis of pulley 46 and axis of pulley 39 so that the loop length of the endless belt 44 may be varied.

It will be seen that a roll of highly oriented film or the like may be accurately and efficiently severed into straight clean cut sheets suitable for package wrapping, and that the operating parts of the machine are reduced to a minimum without affecting its efficiency. Additionally, the needle 37 is arranged to penetrate the film in such a manner as to make use of the easy tear propagation of a highly oriented film in order to insure the machine being safe in use. The only sharp point is the needle 37 at the center of the blade, and it is not necessary that the inclined cutting edges be sharp. The operator, after pulling the outer end portion of the film to the desired distance, then brings the film down over the needle into contact with the edges of the needle so as to be penetrated thereby and then upon continued downward pressure into contact with the edges of the blade. It has been found that by reason of this arrangement of parts a minimum of tension is required to hold down the film as it is pierced by the needle and the blade. The size of the sheets may be varied depending upon the uses to which the severed portion of the film is to be used, and the needle 37 is connected to the blade in any suitable manner. Manifestly, the cutting or severing feature may be used with other types of machines for cutting roll sheet material into predetermined lengths.

When a predetermined end portion 48 of the film is pulled out to the desired length beyond the blade 33 and needle 37, the operator presses the outer end portion of the film downwardly so as to cause the needle 37 initially to penetrate a transversely central portion of the film and, upon the application of continued downward pressure, the film is brought into contact with the inclined edges of the blade along a transverse parting line so as to cut the film evenly into sheets of any desired or predetermined lengths. Thus a maximum number of sheets may be obtained at a minimum expenditure of time, effort and cost.

Figure 5:
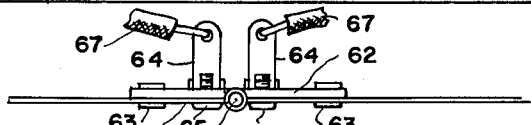
FIGURE 5 is a plan view of FIGURE 4.
Figure 4:
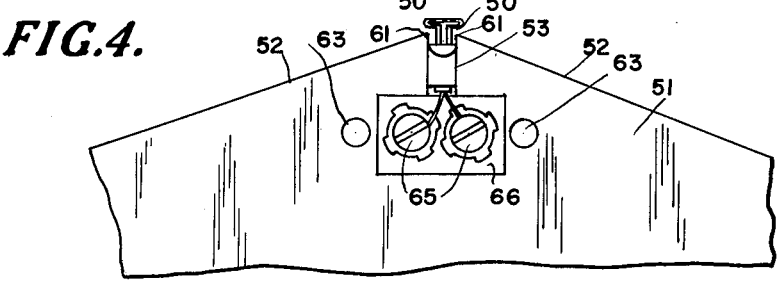
FIGURE 4 is a side elevational view with parts in section of a modified form of blade assembly provided with an electric heating unit.
Figure 6:
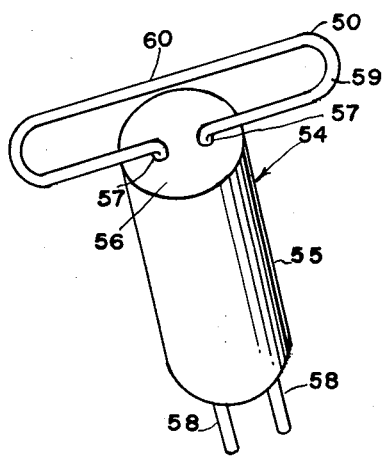
FIGURE 6 is a detail perspective view of the hot tip wire heating element.

In the modified form, shown in FIGURES 4, 5 and 6, a small hot member, such as an electric heated wire 50, is substituted for the needle 37 in the center of the triangular blade 51. This assembly includes forming the blade 51 with V-shaped cutting edges 52 which at their apex are formed with a slot or recess 53 into which is inserted a small hot member, indicated by the numeral 54. The member 54 may include a tubular casing or sleeve 55 (FIG. 6) that carries an elongated insulated member 56 having a pair of longitudinally disposed openings 57 through which extend the spaced ends 58 of a wire 59. The wire 59 is bent intermediate its ends to form a transverse or horizontal elongated loop 60, the ends of which are of such a length as to overlap the adjacent inner blade edges 61 with the confronting walls of the recess 53. Below the recess 53 and secured to one side of the blade 51 is an insulated terminal member or plate 62 secured to one side of the blade 51 by the spaced fastening means 63. The ends 58 of the wire 50 may be connected to L-shaped terminal brackets 64 by the spaced screws 65 that extend through a plate 66 and are also connected by the flexible cables 67 to a suitable source of electric power.

It will be seen that the transverse loop portion 59 of the hot wire 50 is of such a length as to overlap and extend beyond the confronting edges 61 of the triangular blade, so that in operation the film, as it is passed over the blade, will not catch on the pointed edges 61 which would make severing of the film difficult. It has been found that the temperature of the heated wire 50 between 400° F. and 500° F. obtains the best results and that a temperature below 350° F. makes melting difficult. To tear the highly oriented film or other sheet material with a triangular type sheeter or blade, such as 51, the small hot member or wire 50, as the film is brought down over the same, operates to weaken the film by melting it and, as the downward movement of the film continues, the film is severed along a transverse line to form a sheet of the desired length. The marker or indicator on the metering belt is initially set so that, when the end portion of the film is pulled outwardly, it rotates the pulley which in turn moves the endless belt. The belt is so proportioned that the distance it travels corresponds to a predetermined distance, the outer free end of the film moves so that when the marker reaches a predetermined point, the outer free end of the film will be moved a corresponding distance. Thus means are provided for cutting the film to a specific length for the purpose of indicating the point the film should be cut so as to insure uniform separation of the end portion of the film into sheets of predetermined lengths.

The present invention is preferably employed for cutting irradiated biaxially oriented polyethylene film. Such film is old per se and methods of making the same are disclosed in Rainer Patent 2,877,500, as well as in Baird application Serial No. 763,848, filed February 7, 1958, for example. In the illustrative examples, there was employed as the highly oriented film Alathon 14 (polyethylene, molecular weight about 20,000, density 0.916) which had been irradiated to an extent of 12 megarad. and had then been stretched 350% longitudinally and 350% laterally and had a shrink energy of 250 p.s.i. at 96° C.

Other suitable irradiated biaxially oriented polyethylene film includes film that had been irradiated to an extent of 2 to 100 megarad., preferably 6 to 20 megarad. The irradiation can be accomplished, for example, using a 2,000,000 volt General Electric resonant transformer or high energy particle generators of 20,000 to 50,000,000 volts. Other methods of irradiation are described in the Rainer patent and Baird application.

The biaxial orientation is usually carried out to an extent of 100 to 700% longitudinally and 100 to 900% laterally. The preferred method of biaxially stretching is by blowing irradiated polyethylene tubing, as disclosed in the Baird application. The irradiated biaxially stretched polyethylene has a shrink energy of 100 to 1000 p.s.i. at 96° C. While the use of irradiated biaxially oriented polyethylene is preferred, there can also be used unirradiated or irradiated biaxially oriented polypropylene film, as well as biaxially oriented styrene, biaxially oriented saran (vinylidene chloride resin).

Irradiated, biaxially oriented polyethylene, unlike regular polyethylene, has the property of propagating a tear in a straight line, once the tear is initiated.

Thus it will be seen that in all forms of the invention an improved method and means are provided for severing sheet material, such as a piece of film, from a continuous roll at a minimum expenditure of time, effort and cost, so as to insure a uniformly straight tear being imparted to the film along a straight transverse line.

A modification of the instant invention results when the plane of the tear propagating blades 34 are at an acute angle with respect to the plane of the film sheet 48. This will result in making a V tear rather than a relatively straight line cut transverse to the web of the film sheet 48. For some special wrapping application, film sheet sections with this contour would be desirable.

It will be understood that the forms of the invention shown are merely illustrative of preferred embodiments and that such changes may be made in the machine and method without departing from the spirit of the invention and the scope of the claims.

What is claimed is:

1. A film cutting machine including a casing adapted to rotatably mount a roll of film therein, means for supporting and guiding the outer end portion of the film, said means including a transverse bar connected to the casing and longitudinally spaced apart curved arms extending outwardly and upwardly from one side of said bar, each of said arms terminating in an inwardly bent horizontal end portion over which the free end of the film passes, an upwardly extending stationary, generally V-shaped blade extending transversely within the casing and having a recess in the uppermost portion thereof, and fixed means mounted in said recess and extending above said blade for initially opening the central portion of the film so that, as the film is moved outwardly a predetermined distance and is then moved downwardly over the blade, the edges of the blade transversely sever the film along a straight parting line.

2. A film cutting machine as called for in claim 1 in which said fixed means includes a needle.

3. A film cutting machine as called for in claim 1 in which said fixed means includes an electric heating member.

4. A film cutting machine as called for in claim 1 including an electric heating member formed of a wire having an intermediate loop portion.

5. A cutting machine as called for in claim 1 including an endless elastic belt having a marker operatively driven by the roll of film for determining the length of the free end portion of the film to be severed by the blade, and means for adjusting the length of said belt.

6. A film cutting machine of the class described including a casing adapted to rotatably mount a roll of film therein, elastic tension means connected to the casing and engaging the roll of film, means for supporting and guiding the outer end portion of the film as it issues from the roll, said means including a transverse bar connected to the casing, spaced curved arms extending outwardly and upwardly from one side of said bar, each of said arms terminating in an inwardly bent horizontal yieldable end portion over which the free end of the film passes, a substantially U-shaped bar having an intermediate horizontal portion extending transversely over the horizontal end portions of said curved arms, said U-shaped bar having depending ends secured to opposite sides of the casing, an upwardly extending, generally V-shaped blade extending transversely within the casing in stationary relationship thereto, said blade having a recess in its uppermost portion, and means joined to the recessed portion of said blade and extending above the blade for initially opening the central portion of the film so that, as the film is moved outwardly a predetermined distance and then downwardly over the blade, the edges of the blade will transversely sever the film along a straight parting line.

7. A film cutting machine of the class described including a casing adapted to rotatably mount a roll of film therein, elastic tension means connected to the casing and engaging the roll of film, means for supporting and guiding the outer end portion of the film as it issues from the roll, a generally V-shaped blade extending transversely from the casing, means operatively carried by the blade above the apex thereof for initially opening the central portion of the film so that, as the film is moved outwardly a predetermined distance and then downwardly over the blade, the edges of the blade will transversely sever the film along a straight parting line, an endless elastic belt having a marker operatively drawn by the roll of film for determining the length of the free end portion of the film to be severed by the blade, and means for adjusting the length of said belt.

8. A cutting machine of the class described comprising: a casing adapted to rotatably mount a roll of film therein and having an open top, horizontally disposed means adjacent the top of the casing for supporting the outer end portion of the film as the latter is moved over the top, a substantially V-shaped stationary blade extending upwardly and transversely of the casing and in front of said horizontal means, and means joined to the upper end of said blade and extending upwardly and outwardly therefrom for accurately forming an opening in a central portion of said film, said last-mentioned means including an electrically heated wire having an intermediate transversely disposed loop portion.

References Cited in the file of this patent

UNITED STATES PATENTS

| | | |
|---|---|---|
| 1,934,181 | Fouke | Nov. 7, 1933 |
| 2,333,924 | Gorbatenko | Nov. 9, 1943 |
| 2,370,465 | Higby | Feb. 27, 1945 |
| 2,842,201 | Vogt | July 8, 1958 |
| 2,929,907 | Collins | Mar. 22, 1960 |
| 2,942,796 | Gurney et al. | June 28, 1960 |

FOREIGN PATENTS

| | | |
|---|---|---|
| 381,649 | Germany | July 11, 1922 |
| 694,684 | Great Britain | July 22, 1953 |